United States Patent [19]

Frankel et al.

[11] Patent Number: 4,813,790
[45] Date of Patent: Mar. 21, 1989

[54] MOUTH GRIPS FOR ORAL THERMOMETERS

[75] Inventors: Steven T. Frankel, Ho-Ho-Kus; Calvin W. Wingo, Butler, both of N.J.

[73] Assignee: Becton, Dickinson and Company, Franklin Lakes, N.J.

[21] Appl. No.: 77,956

[22] Filed: Jul. 17, 1987

Related U.S. Application Data

[63] Continuation of Ser. No. 981,431, Jul. 28, 1986, abandoned.

[51] Int. Cl.[4] ............................................. G01K 1/14
[52] U.S. Cl. .................................... 374/208; 374/163; 374/194; 374/170; 128/736
[58] Field of Search ............... 374/194, 190, 193, 192, 374/208, 209, 163, 170, 210, 151, 158; 128/736, 207.14, 360

[56] References Cited

U.S. PATENT DOCUMENTS

| | | | |
|---|---|---|---|
| 900,580 | 10/1908 | Nurnberg | 374/193 |
| 1,833,184 | 11/1931 | Schneider | 374/193 |
| 2,445,539 | 7/1948 | Singer | 128/736 |
| 2,579,376 | 12/1951 | Falk | 374/194 |
| 2,767,704 | 10/1956 | Bailey | 128/736 |
| 2,797,682 | 7/1957 | Kannenberg | 128/736 |
| 3,555,907 | 1/1971 | Marcus | 374/192 |
| 4,166,467 | 9/1979 | Abramson | 128/207.14 |
| 4,491,426 | 1/1985 | Berndt | 374/194 |
| 4,502,794 | 3/1985 | Leverty | 374/194 |
| 4,579,464 | 4/1986 | Yamazaki et al. | 374/208 |

FOREIGN PATENT DOCUMENTS

| | | | |
|---|---|---|---|
| 520341 | 2/1921 | France | 128/207.14 |
| 0214230 | 10/1985 | Japan | 374/163 |

Primary Examiner—William A. Cuchlinski, Jr.
Assistant Examiner—Thomas B. Will
Attorney, Agent, or Firm—John L. Voellmicke

[57] ABSTRACT

A thermometer for orally measuring the temperature of a living being comprises a mouthpiece for insertion into the mouth of a living being. A temperature sensitive element is on the mouthpiece. There is at least one raised protuberance on the surface of the mouthpiece for engagement with the mouth of the living being during use of the thermometer to inhibit the thermometer from sliding out of the mouth. A visual temperature display is associated with the temperature sensitive element for indicating the temperature being measured.

6 Claims, 2 Drawing Sheets

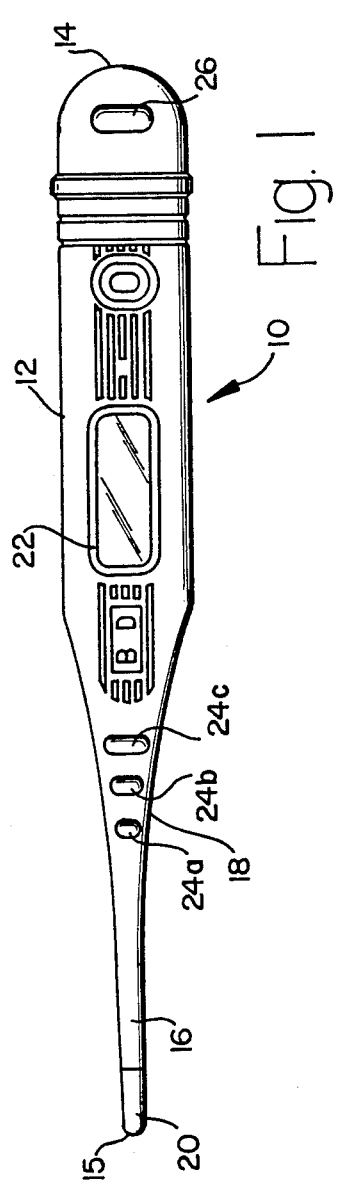
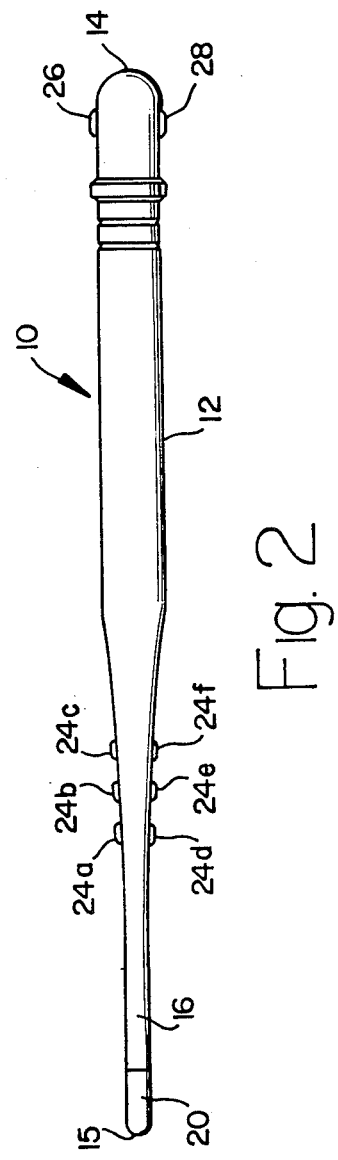

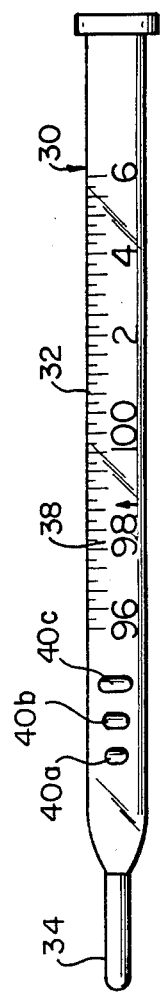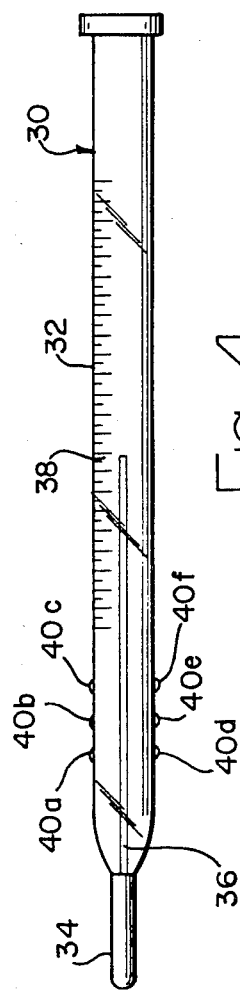
Fig. 3
Fig. 4

MOUTH GRIPS FOR ORAL THERMOMETERS

This application is a continuation of application Ser. No. 981,431, filed July 28, 1986, now abandoned.

BACKGROUND OF THE INVENTION

1. Field of the Invention

The present invention relates to a thermometer, and more particularly, concerns an oral thermometer having one or more mouth grips for inhibiting the thermometer from sliding out of the mouth of the user.

2. Background Description

In the use of clinical thermometers to measure temperature of a living being, it is quite convenient to obtain the body temperature from the mouth cavity. Thermometers have been used in this fashion for many years, one such thermometer being the well-known B-D[R] brand glass thermometer which uses a thin column of liquid mercury as the operative element for measuring temperature along a linear scale. Lately, digital thermometers have been gaining acceptance for use in measuring body temperatures of a living being.

Particularly in those instances where the thermometer is used for orally measuring the temperature of a living being, the mouthpiece element, whether on a well-known glass thermometer or the more recent digital thermometers, is generally a smooth-surfaced elongate probe for insertion into the mouth of the living being. If the individual whose temperature is being measured is, for example, a child, the smooth surface on the mouth receiving portion of the thermometer may create slippage problems, particularly if salivation occurs. If the thermometer slips out of the individual's mouth, it is appreciated that the temperature reading may be inaccurate or unreliable. Accordingly, there is a need to provide an anti-slip-page mechanism on the mouth-receiving portion of thermometers for measuring temperature from the oral cavity.

One such thermometer mouthpiece for releasably holding a thermometer at a pre-determined location, so that the positioning of the device in the mouth of a user results in the proper extension of the thermometer bulb into the mouth cavity, is disclosed in U.S. Pat. No. 4,502,794. U.S. Pat. No. 2,445,539 discloses a clinical thermometer with non-circular spaced flanges for locating the thermometer in the mouth of a patient. U.S. Pat. No. 2,579,376 discloses a resilient finger grip for thermometer.

Notwithstanding the device described in the aforementioned patent, further improvements for holding a thermometer within the oral cavity during the measuring period are still being sought. It is to such an improvement that the present invention is directed.

SUMMARY OF THE INVENTION

The oral temperature thermometer of the present invention comprises temperature sensitive means for measuring the temperature inside the mouth of a living being. Means are provided for inhibiting the sliding movement of the thermometer out of the mouth of the living being. Temperature display means, associated with the temperature sensitive means, are included for indicating the temperature being measured.

In a preferred embodiment of the invention, a thermometer for orally measuring the temperature of a living being comprises a housing and a mouthpiece extending outwardly therefrom in a distal direction. The mouthpiece is relatively elongate and slender to facilitate insertion into the mouth of a living being. A temperature sensitive element is located on the distal end of the mouthpiece for placement into the mouth for measuring temperature. A digital display is included on the housing, and electrical means in the housing converts the temperature measured in the mouth of the being into digital read-out form. Further included is a plurality of raised, discontinuous protuberances on the outside surface of the mouthpiece for engagement with the mouth during use of the thermometer to inhibit the thermometer from sliding out of the mouth. Further, the preferred embodiment of the present invention includes a plurality of raised, discontinuous surfaces on the proximal end of the housing to facilitate gripping of the housing by a user of the thermometer.

In accordance with the principles of the present invention, there are a number of advantages and beneficial features which are provided. Most significantly, the present invention provides a mechanism on the mouthpiece of the thermometer which inhibits sliding movement out of the mouth into which the thermometer is positioned. By inhibiting such sliding movement, the temperature sensitive element of the thermometer remains in the proper position during the temperature measuring period. Thus, more accurate and reliable temperature results can be expected. In an embodiment of the present invention, finger grips are provided on the proximal end of the thermometer housing for facilitating the gripping of the housing by a user of the thermometer. These finger grips make it easier to handle the thermometer so that the thermometer does not slip out of the hands of the user either during the insertion phase or the removal phase, particularly once the temperature has been measured. Other advantages and features of the present invention will become more apparent upon reading the Detailed Description below.

BRIEF DESCRIPTION OF THE DRAWINGS

FIG. 1 is a side elevational view of an electronic digital thermometer which includes the preferred embodiment of the mouth grips of the present invention;

FIG. 2 is a top plan view of the embodiment of FIG. 1;

FIG. 3 is a side elevational view of a liquid mercury analog thermometer including the preferred mouth grips of the present invention; and FIG. 4 is a top plan view of the embodiment of FIG. 3.

DETAILED DESCRIPTION

While this invention is satisfied by embodiments in many different forms, there is shown in the drawings and will herein be described in detail preferred embodiments of the invention, with the understanding that the present disclosure is to be considered as exemplary of the principles of the invention and is not intended to limit the invention to the embodiments illustrated. The scope of the invention will be measured by the appended claims and their equivalents.

Adverting now to the drawings, and FIGS. 1 and 2 in particular, there is illustrated a clinical thermometer 10 in the form of an electronic digital thermometer. This specific digital thermometer illustrated and described herein is available from the Becton Dickinson Consumer Products Division, Rochelle Park, N.J. It can be seen that thermometer 10 includes a housing 12 with a proximal end 14 and a distal end 15. Proximal end 14 is the end normally grasped by a user of the thermometer, while distal end 15 is the end directed toward the mouth of the living being whose temperature is to be measured. In this embodiment, housing 12 is tapered toward distal end 15 so that a mouthpiece 16 is formed. As seen in the drawings, mouthpiece 16 is relatively elongate and slender to facilitate its insertion into the mouth of the living being. In the electronic digital thermometer being described, it is preferred that mouthpiece 16 be integrally formed from the same material, and as a unitary structure with, housing 12. To this end, a smoothly tapering portion 18 serves as the transition region between the main body of housing 12 and mouthpiece 16.

At distal end 15 is a temperature sensitive element 20, which is typically a metallic element which effectively transmits heat inside the mouth to the thermometer. The thermally sensitive element is electrically connected by an electrical circuit (not shown) enclosed within housing 12. Associated with the electrical circuit and temperature sensitive element 20 is a temperature display 22 for digitally displaying, in direct read-out form, the temperature being measured. In a fashion well-known to those skilled in the art, the analog temperature sensed by element 20 is converted by the appropriate electrical circuitry into digital read-out form so that the actual temperature being measured is visually displayed by display 22. Liquid crystals or light emitting diodes (LED's) are commonly used for such digital displays.

During use of thermometer 10, mouthpiece 16, which extends outwardly from housing 12, is typically inserted into the mouth of the living being so that temperature sensitive element 20 is positioned under the tongue. So as to prevent the mouthpiece from sliding out of the mouth of the living being, gripping elements are provided on the thermometer. In the embodiment being described, there are six such gripping elements located on mouthpiece 16. It can be seen that the gripping elements are represented preferably as raised, discontinuous protuberances 24a–24f. While discontinuous protuberances are preferred for purposes of the present invention, any protuberance may also be in the form of an annular ring around the outside surface of the mouthpiece. However, separate, discontinuous protuberances as seen in FIGS. 1 and 2, are most suitable for the present invention because they can be formed at different places and in different sizes to provide an effective anti-sliding mechanism.

Specifically, in the embodiment being described, there are three raised protuberances 24a,24b and 24c on one side of mouthpiece 16, and on the opposite side of the mouthpiece there are three additional protuberances 24d,24e and 24f. The three protuberances on each side of the mouthpiece are preferably arranged in single file along the elongate dimension of the mouthpiece. Further, it is preferred that protuberances 24 be sized so that each protuberance decreases in size in the direction toward the distal end of the mouthpiece. Further, the shape of the protuberances may vary, but it is preferred that the protuberances be substantially ovally shaped with the major axis of each oval lying substantially perpendicular to the elongate dimension of the mouthpiece.

When the thermometer of the present invention is used, mouthpiece 16 is inserted into the mouth of the living being, and protuberances 24 contact the mouth, lips, or teeth, or combinations thereof, thereby providing an appropriate mechanism to assure a holding of the thermometer in place while in the mouth of the living being.

In addition to gripping means for the mouth of the living being whose temperature is being measured, a gripping mechanism is also provided on proximal portion 14 of the thermometer. It can be seen in the embodiment of FIGS. 1 and 2 that there are two opposed raised surfaces 26 and 28 on the outside surface of housing 12 spaced slightly inwardly from the proximal end. It is the purpose of raised surfaces 26 and 28 to provide a surface that, when held by the user of the thermometer, enhances the grip that the user maintains on the thermometer. Raised surfaces 26 and 28 are preferably positioned opposite each other while being annularly spaced around the periphery of the proximal portion of the housing.

The gripping mechanisms described above are not only compatible with electronic digital thermometers, but may also be employed on the well-known glass bulb thermometer 30 such as seen in FIGS. 3 and 4. In this well-known thermometer, a relatively elongate and slender glass tube 32 is connected to a metallic temperature sensitive element 34. Within the glass tube and associated with element 34 is a column of liquid mercury 36. As is well-known, when thermometer 30 is inserted so that temperature sensitive element 34 is in the mouth of the living being, column of mercury 36 moves along a linear scale 38 as a function of temperature associated with the temperature being measured inside the mouth. In this embodiment, there are also six discontinuous, raised protuberances 40a–40f, arranged so that there are three such protuberances on each side of the tube 32. Protuberances 40 are preferably arranged, sized and shaped substantially as in the above-described embodiment. However, in the embodiment of FIGS. 3 and 4, it is preferred that protuberances 40 be made of the same material as tube 40, typically glass. In the embodiment of FIGS. 1 and 2, the tapered portion of mouthpiece 16 is preferably plastic so that protuberances 24 are also preferably plastic, and integrally formed as a unitary structure with the mouthpiece.

Thus, the present invention provides convenient mouth grip elements for an oral thermometer for inhibiting the thermometer from sliding out of the mouth of the living being. In one embodiment of the present invention, the thermometer also includes finger grips on the housing to facilitate gripping by the holder of the thermometer.

What is claimed is:

1. A thermometer for orally measuring the temperature of a living being comprising:
   a housing and a mouthpiece extending outwardly therefrom in a distal direction, said mouthpiece being relatively elongate and slender to facilitate insertion into the mouth of a living being;
   a temperature sensitive element located on the distal end of the mouthpiece for placement into the mouth for measuring temperature thereof;
   a digital display on said housing and electrical means in said housing for converting the temperature measured in the mouth of said being into digital read-out form;
   a first plurality of raised, discontinuous protuberances on the outside surface of said mouthpiece and a second plurality of raised, discontinuous protuberances on the outside surface of said mouthpiece opposed from said first plurality of protuberances, said first plurality and said second plurality of protuberances arranged in single file along the elongate dimension on opposite sides of said mouthpiece, said protuberances providing engagement with said mouth during use of the thermometer to inhibit the thermometer from sliding out of the mouth, said first plurality of raised discontinuous protuberances, said second plurality of raised discontinuous protuberances and said mouthpiece being integrally formed from the same material; and a plurality of raised, discontinuous surfaces on the proximal end of said housing to facilitate griping of the housing by the hand of a holder of the thermometer.

2. The thermometer of claim 1 wherein said first plurality of raised discontinuous protuberances includes at least three protuberances and said second plurality of raised discontinuous protuberances includes at least three protuberances.

3. The thermometer of claim 1 wherein the protuberances are of different sizes, the size of each protuberance descreasing in the direction toward the distal end of said mouthpiece.

4. The thermometer of claim 3 wherein said protuberances are substantially ovally shaped with the major axis of each oval lying substantially perpendicular to the elongate dimension of said mouthpiece.

5. The thermometer of claim 1 wherein said housing and said mouthpiece are integrally formed from the same material as a unitary structure.

6. A thermometer for orally measuring the temperature of a living being comprising:

a housing and a mouthpiece extending outwardly therefrom in a distal direction, said mouthpiece being relatively elongate and slender to facilitate insertion into the mouth of a living being;

a temperature sensitive element located on the distal end of the mouthpiece for placement into the mouth for measuring temperature thereof;

a digital display on said housing and electrical means in said housing for converting the temperature measured in the mouth of said being into digital read-out form; and a first plurality of at least three raised, discontinuous protuberances on the outside surface of said mouthpiece and a second plurality of at least three raised, discontinuous protuberances on the outside surface of said mouthpiece opposed from said first plurality of protuberances, said first plurality and said second plurality of protuberances arranged in single file along the elongate dimension on opposite sides of said mouthpiece, said protuberances and said mouthpiece being integrally formed from the same material as a unitary structure, said protuberances providing engagement with said mouth during use of the thermometer to inhibit the thermometer from sliding out of the mouth; and a plurality of raised, discontinuous surfaces on the proximal end of said housing to facilitate gripping of the housing by the hand of the holder of the thermometer.

* * * * *